US007140114B2

(12) United States Patent
Shenker et al.

(10) Patent No.: US 7,140,114 B2
(45) Date of Patent: Nov. 28, 2006

(54) GUARD FOR CHAINSAW

(75) Inventors: Michael R. Shenker, Portland, OR (US); Karl G. Usher, Portland, OR (US)

(73) Assignee: Safeguard, Inc., Portland, OR (US)

( * ) Notice: Subject to any disclaimer, the term of this patent is extended or adjusted under 35 U.S.C. 154(b) by 0 days.

(21) Appl. No.: 10/805,542

(22) Filed: Mar. 19, 2004

(65) Prior Publication Data

US 2004/0250431 A1 Dec. 16, 2004

Related U.S. Application Data

(60) Provisional application No. 60/478,660, filed on Jun. 13, 2003.

(51) Int. Cl.
*B23D 57/02* (2006.01)

(52) U.S. Cl. .......................................... 30/382; 30/371

(58) Field of Classification Search .................. 30/382, 30/383, 286, 371
See application file for complete search history.

(56) References Cited

U.S. PATENT DOCUMENTS

| | | | | | |
|---|---|---|---|---|---|
| 3,059,673 | A | * | 10/1962 | Woleslagle | 30/161 |
| 3,292,671 | A | * | 12/1966 | Stromberg | 83/860 |
| 3,384,136 | A | | 5/1968 | Marin et al. | |
| 3,754,328 | A | * | 8/1973 | Knerr | 30/382 |
| 4,193,193 | A | * | 3/1980 | Holzworth | 30/382 |
| 4,447,953 | A | * | 5/1984 | Lombardino et al. | 30/382 |
| 4,621,426 | A | | 11/1986 | Shivers | |
| 4,841,641 | A | | 6/1989 | Laidlaw | |
| 4,945,641 | A | * | 8/1990 | Miller et al. | 30/382 |
| 4,991,297 | A | | 2/1991 | Cain | |
| 5,179,785 | A | | 1/1993 | Nagashima | |
| D341,762 | S | | 11/1993 | Long et al. | |
| 5,269,064 | A | | 12/1993 | Greene et al. | |
| 5,850,696 | A | | 12/1998 | Sciarrone | |

FOREIGN PATENT DOCUMENTS

DE 805935 6/1951

OTHER PUBLICATIONS

Photographs of chain saw guard sold prior to Jun. 13, 2002 (7 pages).

* cited by examiner

*Primary Examiner*—Hwei-Siu Payer
(74) *Attorney, Agent, or Firm*—Klarquist Sparkman, LLP

(57) ABSTRACT

The present disclosure concerns embodiments of an improved chainsaw guard. The saw guard includes a pivotable guard arm that may include downwardly extending saw chain guarding walls. In particular embodiments, the guard arm is pivotally connected to a mounting bracket, which is adapted to accommodate mounting the guard to the bar studs of various chainsaws having different bar stud spacing. The mounting bracket may be swept back to facilitate mounting to a wide variety of chainsaw models. The guard arm may include a handle adjacent the chainsaw housing to permit the guard arm to be lifted away from the guide bar so as to provide access to the upper run of the saw chain such as to perform maintenance or to permit positioning of the saw chain against a work piece in an undercutting operation.

26 Claims, 5 Drawing Sheets

GUARD FOR CHAINSAW

CROSS-REFERENCE TO RELATED APPLICATION

This application claims the benefit of U.S. Provisional Application No. 60/478,660, filed Jun. 13, 2003.

FIELD

The present disclosure relates to a guard for a chainsaw, more particularly, to a guard which reduces the risk of injury to the user of a chainsaw in the event that the saw undergoes "kickback."

BACKGROUND

While a chainsaw is a very useful tool it is also a very hazardous tool because of the presence of the rapidly moving saw chain that is supported on the saw bar that protrudes from the motor or engine propelling the chain. Very serious and sometimes fatal injuries have been caused by so called kickback of the saw bar resulting when the rapidly moving chain hits some rigid or immovable object and causes the forward portion of the saw bar to be propelled upwardly and backwardly towards the user so that the user is struck by the rapidly moving chain on the upper course of the saw bar. U.S. Pat. No. 4,991,297 provides one example of a safety guard designed to provide an intervening member between the saw chain and the user in the event of such kickback.

SUMMARY

The present disclosure concerns embodiments of an improved saw guard that reduces the risk of operator injury caused by chainsaw kickback while minimizing any interference with the normal operation of the chainsaw. The saw guard comprises a guard arm that extends forwardly from the housing of a chainsaw and serves as an intervening member between the upper run of the chain and an operator to provide a shield between the operator and the saw chain such as in the event the chainsaw kicks back while cutting a work piece.

In particular embodiments, the guard arm is pivotally coupled to the housing to permit pivoting of the guard arm in opposed directions toward and away from the guide bar. For example, the guard arm can be pivotally connected to a mounting bracket, which in turn is mounted to the frame or housing of the chainsaw. In certain embodiments, for example, the mounting bracket is adapted to be mounted to the ends of the bar studs of the chainsaw. In this manner, the saw guard can be easily installed on existing chainsaws.

The mounting bracket in some embodiments comprises a body with an upper portion that mounts the guard arm and a lower portion that is swept back or extends rearwardly from the upper portion. The lower portion may comprise an aperture dimensioned to receive one of the bar studs of the saw or a fastener for securing the bracket to the bar stud. The lower portion also desirably includes an elongated slot dimensioned to receive the other bar stud or a fastener for securing the bracket to that bar stud. Since the spacing between the bar studs can vary depending on the make or model of the chainsaw, the slot desirably is of sufficient length to accommodate the mounting of the bracket to a number of different chainsaws having different bar stud spacing. The swept back lower portion of the body also accommodates mounting to a wide variety of chainsaws.

In use, the guard arm is desirably supported at a predetermined height above the guide bar in a generally parallel relationship therewith. As the saw chain cuts through a work piece (e.g., a log), the work piece contacts the lower surface of the guard arm, causing the guard arm to pivot upwardly relative to the guide bar. If the saw chain strikes a relatively hard surface, such as a foreign object in the work piece, so as to cause the saw to kick back toward the operator, the guard arm provides a shield between the operator and the saw chain. The guard also acts to provide some shielding of the upper portions of the chain at times other than when kick back occurs.

The saw guard also in some embodiments comprises a lever or handle located at a convenient position on the guard arm adjacent the housing of the chainsaw. The handle allows an operator to easily raise the guard arm upwardly and away from the guide bar so as to provide access to the upper run of the saw chain, such as for sharpening or cleaning the chain or to permit positioning of the upper run of the saw chain against a work piece in an undercutting operation.

The saw guard also may comprise a biasing member, such as a coil spring, that is operable to resiliently retain the guard arm in a lowered or down position at which the guard arm is located slightly above the top of the guide bar. The biasing member may also be operable to resiliently retain the guard in a raised position to provide access to the upper run of the saw chain. In an illustrated embodiment, for example, a spring is secured at one end to the guard arm and at the opposite end to a mounting bracket. When the guard arm is within a first range of motion between the down position and an intermediate position between the down and raised positions, the spring extends below the pivot axis of the guard arm to bias the guard arm toward the down position. However, when the guard arm is within a second range of motion between the intermediate position and the raised position, the spring extends above the pivot axis to bias the guard arm upwardly toward the raised position.

The guard arm may be formed with downwardly extending side walls that serve as barriers to help in retarding or restraining lateral movement of the saw chain beyond the longitudinal sides of the guard arm, such as during kickback of the saw. For example, the guard arm can be an inverted channel-like element comprising a generally flat central portion and side flanges extending downwardly from opposite sides of the central portion.

The foregoing and other features and advantages of the invention will become more apparent from the following detailed description of several embodiments, which proceeds with reference to the accompanying figures. The present invention includes all novel and non-obvious features and method acts disclosed herein both alone and in novel and non-obvious subcombinations thereof.

DETAILED DESCRIPTION

As used herein, the singular forms "a," "an," and "the" refer to one or more than one, unless the context clearly dictates otherwise. As used herein, the term "includes" means "comprises."

Figure 2:
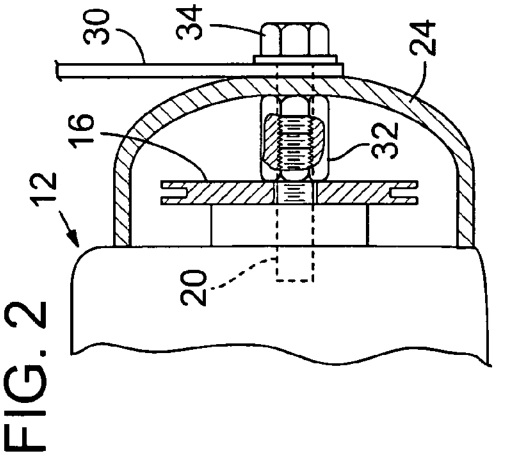
FIG. 2 is a fragmentary, cross-sectional view taken along line 2—2 of FIG. 1.
Figure 1:
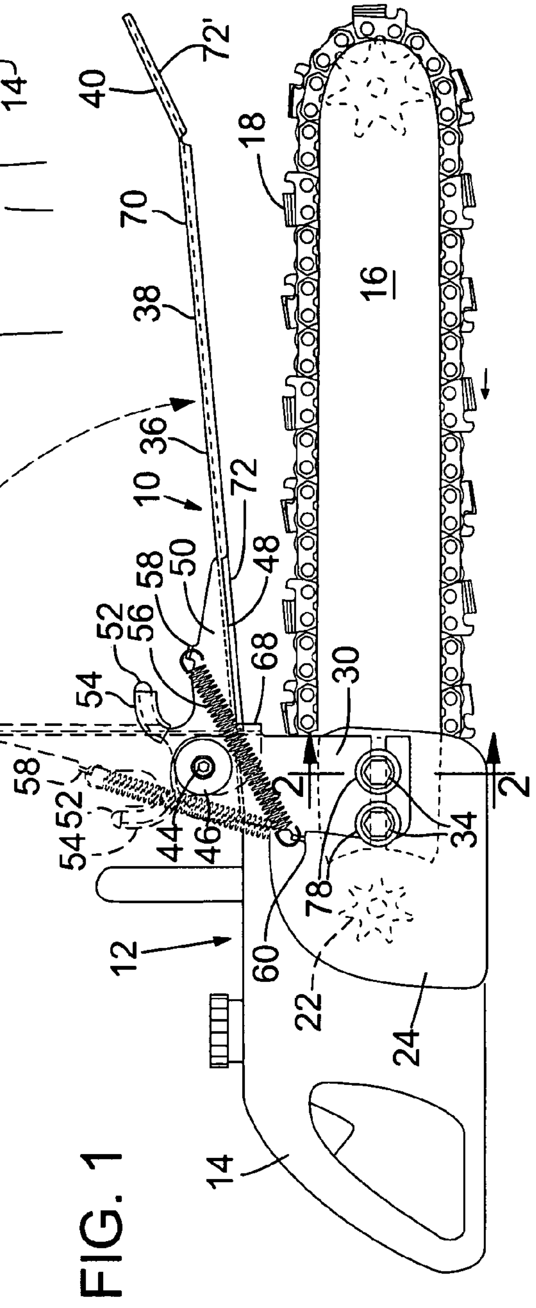
FIG. 1 is a side elevation view of a chainsaw equipped with one embodiment of a saw guard and showing the guard in solid lines in its normal operative position and in dotted lines in a raised position desired for certain purposes.
Figure 4:
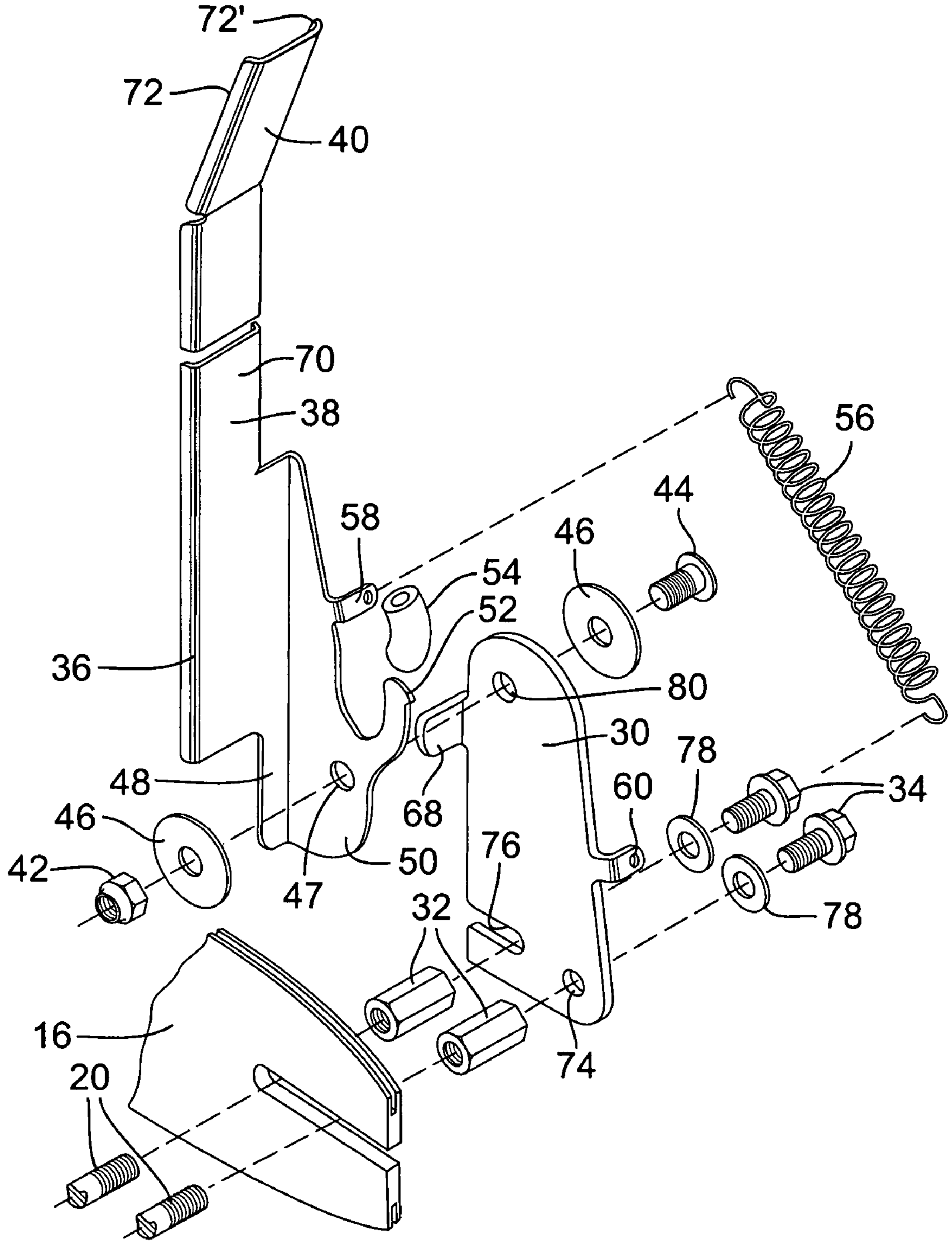
FIG. 4 is a fragmentary exploded view of the chainsaw guard of FIG. 1 showing the various parts thereof.

Referring first to FIGS. 1 and 4, a chainsaw guard constructed according to one embodiment is indicated generally at 10 and is shown mounted upon a chainsaw 12 (FIG. 1). As shown in FIG. 1, the chainsaw 12 includes a housing or frame 14 containing a drive motor (not shown) which may be, for example, a gasoline-fueled motor or an electric motor. In the illustrated embodiment, a saw chain guide bar 16 supporting a saw chain 18 is secured by bar studs 20 (FIGS. 2 and 4) extending from the motor body (not shown) in proximity to a sprocket 22 (FIG. 1) driven by the chainsaw motor and around which sprocket the saw chain 18 is carried. In addition, the chainsaw can include a protective shield 24 (FIG. 1) that is secured to the housing 14 and sized and shaped to extend over the drive sprocket, the base end of the guide bar 16 and the adjacent portion of the saw chain 18 to protect the chainsaw operator.

Referring also to FIGS. 3A–3D, the guard 10 in the illustrated configuration generally includes an elongated guard arm 36 (also referred to herein as a guard member in other embodiments) supported above the saw chain 18 and a mounting member such as a mounting bracket 30. Bracket 30 may comprise a body such as comprising a base plate or a guard mounting member. Bracket 30 mounts the guard to the chainsaw 12. In particular embodiments, the mounting bracket 30 is desirably configured to be rigidly mounted to the shield 24 by means of the bar studs 20 which also secure the guide bar 16 to the motor body. As best shown in FIG. 4, the illustrated mounting bracket 30 is formed with a first opening 74 and a second opening 76 comprising an elongated slot. In some implementations, such as when retrofitting an existing chainsaw, it may be necessary to mount internally threaded extenders 32 onto the studs 20, if such studs do not extend sufficiently far from the housing 14 to extend through the openings 74, 76 of the mounting bracket 30. The mounting bracket 30 may be secured in position on the extenders by cap screws 34 extending through washers 78 and openings 74, 76 and threaded into the extenders (as best shown in FIG. 4). In other embodiments, however, the bar studs 20 may be of sufficient length to extend through the openings 74, 76 of the mounting bracket 30, which can be secured in place by respective nuts tightened onto the ends of the studs. Other techniques or mechanisms also can be used to mount the mounting bracket 30 to the chainsaw. For example, although less desirable, the saw guard can be permanently mounted to the chainsaw, such as by welding the guard to the bar studs, the protective shield 24, or to another location on the chainsaw.

The illustrated form of guard arm 36 has a proximal end portion 48 that is pivotally coupled to the mounting bracket 30 and a distal or free end portion 40. As used herein, the term "coupled to" can include direct or indirect mounting of one component to another component. The guard arm in the illustrated form includes a substantially straight elongated major base or inner arm portion 38 which desirably extends from a location adjacent the motor housing for the major portion of the length of the saw guide bar 16. The free end portion 40 of the guard arm 36 can optionally be upturned relative to the saw bar, as shown in FIG. 1, and desirably extends at least to the end of the guide bar 16.

As best shown in FIG. 4, the guard arm 36 can be pivotally mounted to the mounting bracket 30 using a nut 42, bolt 44 and suitable washers 46 such that the arm 36 may pivot about a pivot axis defined by bolt 44 (as indicated by double-headed arrow A in FIG. 1) between a protective operating or down position (indicated in solid lines in FIG. 1), and an elevated or raised position (shown in dotted lines in FIG. 1). The bolt 44 in the illustrated configuration extends through an opening 80 provided in the mounting bracket 30 and an opening 47 provided in a flange 50 which may be integral with the proximal end portion 48 of guard arm 36.

A trigger-like extension portion or lever 52 is conveniently located on the flange 50 to allow the operator of the chainsaw to pivot the guard arm 36 upwardly and away from the saw bar 16. Lever 52 may be of an extended length to facilitate use of the lever to raise the guard. This upward position may be used, for example, to provide access to the upper run of the saw chain 18 on the bar for sharpening or cleaning the chain or to permit the saw to be used in an undercutting operation, as further described below. An elastomeric gripping pad, such as in the form of a short length of rubber tubing 54 or a plastic sleeve, can be mounted on the lever 52. In the embodiment shown in FIGS. 1–5, the lever 52 is dimensioned to permit an operator to grasp the lever with one or two fingers. In other embodiments, such as described below, the lever can be dimensioned to permit an operator to use the entire hand when lifting or lowering the guard arm.

Figures 3A, 3B, 3C, 3D:
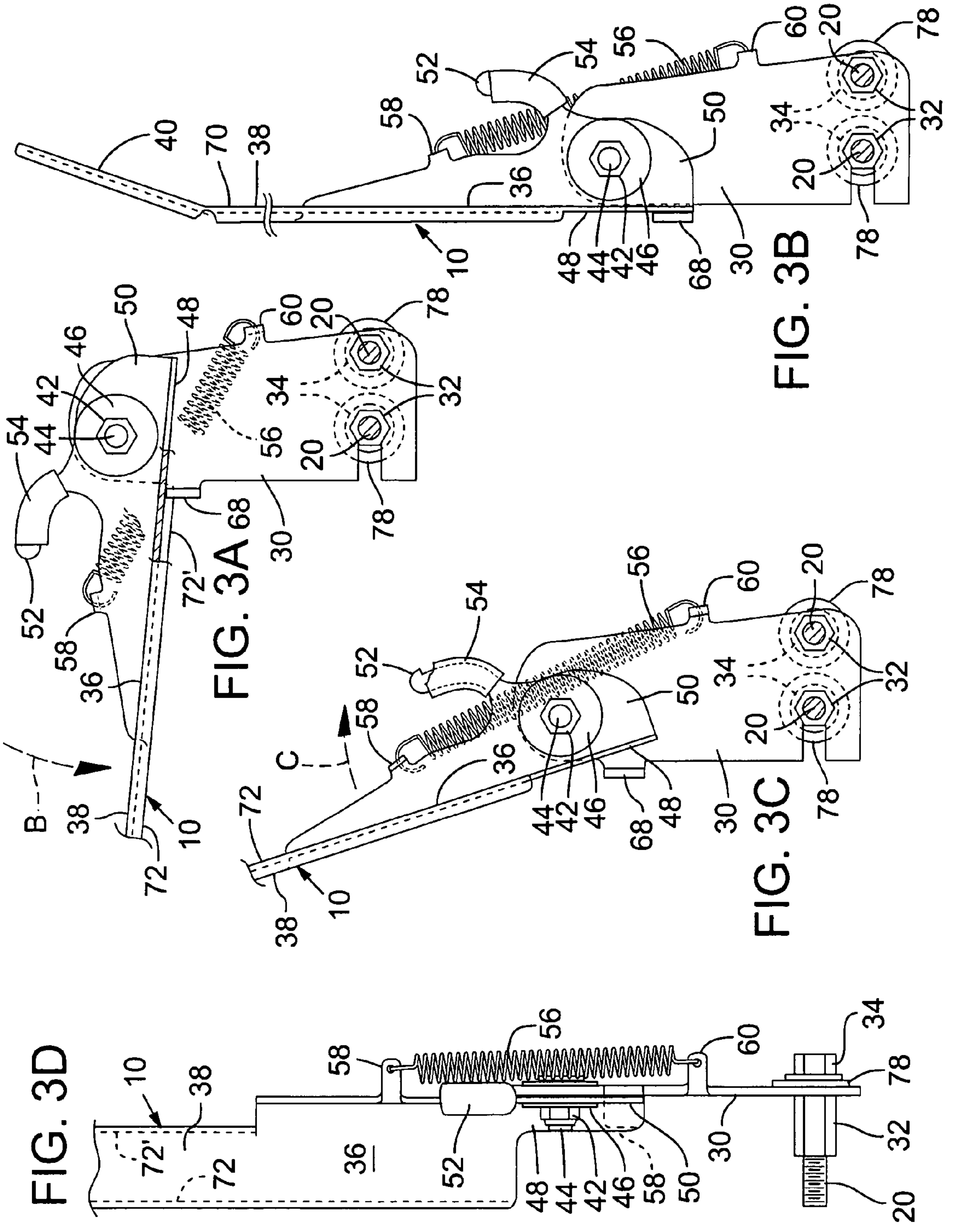
FIG. 3A is a fragmentary side elevation of the saw guard of FIG. 1 shown in isolation from a chainsaw and viewed from the side opposite that of FIG. 1.
FIG. 3B is a fragmentary view of the saw guard of FIG. 1 showing the guard arm in its fully raised position.
FIG. 3C is a fragmentary view of the saw guard of FIG. 1 showing a portion of the guard arm in a position intermediate to its lowered position and its fully raised position.
FIG. 3D is a fragmentary top plan view of the saw guard of FIG. 1.

One or more stop members desirably are provided to limit downward pivoting of the guard arm 36 toward the guide bar 16 and/or to limit upward pivoting of the guard arm away from the guide bar 16. In the illustrated embodiment, and as best shown in FIGS. 3A and 4, a stop, such as a protruding flange 68 is provided on the mounting bracket 30. The flange 68 in the form shown has an upper surface that engages the bottom surface of the guard arm 36 (as shown in FIG. 3A) and supports the guard arm at a predetermined height above the guide bar 16 when the guard arm is rotated to its down position shown in FIG. 1. The flange 68 also may perform the dual function of arresting upward pivoting of the guard arm 36. For example, as best shown in FIG. 3*b,* as the guard arm swings to its upward position, the rear surface of the stop element 68 engages the bottom surface of the guard arm to prevent further pivoting of the guard arm when the guard arm is in a substantially perpendicular orientation relative to the guide bar 16. In other embodiments, one stop element can be located on the mounting bracket to limit downward movement of the guard arm and a separate stop element can be located on the mounting bracket to limit pivoting of the guard arm in the opposite direction, as described in the previously mentioned '297 patent. In addition, stop element (s) can be positioned to define a range of motion that differs from that shown in the illustrated embodiment.

A biasing member, such as the illustrated coil spring 56, can be provided to urge the guard arm 36 downwardly to a lower position. Alternatively, the biasing member or a separate member may be used to retain the arm in its elevated, out of the way position. In the illustrated embodiment, one end of the spring 56 can be secured in an opening in a tab portion 58 on the guard arm flange 50 and the other end of the spring can be engaged in an opening in a tab portion 60 on the mounting bracket 30 (as best shown in FIGS. 1 and 4). The tab portions 58, 60 desirably are so located that, in the down position of the guard arm 36, the spring 56 extends beneath the pivot axis of the mounting bolt 44 (FIGS. 1 and 3A), but in the elevated position of the guard arm, the spring extends on the upper side of the pivot axis of the mounting bolt 44 (FIGS. 1 and 3C). Thus, a first range of motion of the guard arm is defined between the down position and an intermediate position at which the spring intersects the pivot axis, and a second range of motion of the guard arm is defined between the intermediate position and the elevated position. By reason of this arrangement of the spring, the spring resiliently urges the guard arm toward the down position when the guard arm is within the first range of motion between the down position and the intermediate position (as indicated by arrow B in FIG. 3A). However, the spring resiliently urges the guard arm toward the raised position when the guard arm is within the second range of motion between the intermediate position and the raised position (as indicated by arrow C in FIG. 3C).

In an alternative embodiment, the spring can be configured to resiliently retain the guard arm in a down position, and, for example, when the guard arm is pivoted to a raised position, a manually-activated retaining mechanism is used to retain the guard arm in the raised position. One example of such a retaining mechanism is shown in U.S. Pat. No. 4,991,297.

The spring 56 desirably is selected to have a spring force sufficient to prevent pivoting of the guard arm under its own inertia and to prevent or minimize vibration of the guard arm while using the chainsaw, but yet easily permit the guard arm to be moved by an operator or through contact with a work piece, as further described below. Although variable, in a specific embodiment, the spring 56 has a spring force of about 20.76 lbs./inch although the spring force can be greater or less than 20.76 lbs./inch. In alternative embodiments, other forms of biasing members can be used instead of the illustrated spring 56, such as a length of tubing or a strap made of rubber or similar materials.

Figure 5:
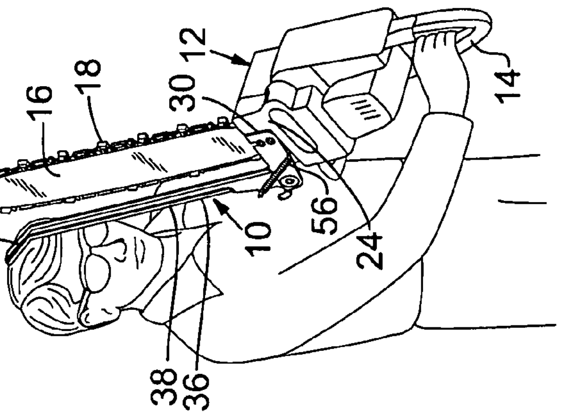
FIG. 5 is a perspective view illustrating an example of the saw guard of FIG. 1 providing shielding for the user, such as in the event of kickback of the chainsaw.

The guard arm 36 can be provided with opposing, downwardly extending side walls to provide barriers or guides that tend to retain the saw chain behind the guard arm and between the guides in the event that a portion of the chain wanders from the guide bar during kickback of an operating saw as shown in FIG. 5. In particular embodiments, for example, the guard arm 36 comprises an inverted channel-like element comprising a flat central portion 70 and side portions or flanges 72, 72' extending downwardly from opposite sides of the central portion so as to define a generally cup or U-shaped cross-sectional profile along the majority of the length of the guard arm. In another embodiment, the guard arm can have a concave curved cross-sectional profile having downwardly extending side walls. In still another less desirable embodiment, the guard arm 36 can be a generally flat member without any depending side flanges.

In the usual normal operation of the chainsaw, a work piece (e.g., a log or branch) is engaged by bringing the chainsaw downwardly against the work piece so that the latter is engaged by the portion of the rotating saw chain 18. As the saw chain and guide bar pass through the work piece, the lower surface of the guard arm contacts the work piece and is pivoted upward relative to the saw chain. If the guard arm is within the first range of motion at the end of a cut, the spring 56 pulls the guard arm back to its down position. In some instances the size of the work piece causes the guard arm to pivot into the second range of motion, in which case the spring will retain the guard arm in the up position at the end of the cut. In such cases, the trigger or lever 52 allows the operator to easily return the guard arm back to the down position before making another cut.

Kickback usually does not occur in such operation unless the saw chain moving over the bar 16 engages a relatively hard surface or object. When this occurs, the nose of the bar may be thrown violently upwardly and backwardly towards the upper torso of the chainsaw operator, as shown in FIG. 5. In the event of such an occurrence, the guard arm 36 will act as a shield for the portion of the saw chain 18 moving along the upper side of the guide bar to reduce the risk of the saw chain contacting the operator, thereby reducing the risk of serious, perhaps catastrophic injury. As indicated above, the presence of the flanges 72, 72' reduces the possibility of the saw chain moving laterally beyond the sides of the guard arm during kickback.

The upturned end 40 of the guard arm 36 facilitates the insertion of the guide bar 16 beneath a work piece such as a limb or log in the event an operator desires to make a so-called "undercut," which involves engaging the work piece with the chain portion moving along the upper side of the guide bar 16. More specifically, when the operator desires to undercut a work piece, the distal end of the guide bar 16 is positioned close to the work piece and the upturned distal end portion 40 of the guard arm 36 is placed in contact with the work piece. The guide bar 16 may then be positioned under the work piece simultaneously with the top of the work piece being used to maneuver the guard arm 36 toward its up position. If desired, the guard arm 36 can be manually raised using lever 52 to facilitate positioning of the guide bar 16 under the work piece prior to beginning the cut.

Any unexpected movement of the chainsaw while undercutting the work piece, such as may be induced by the saw chain striking a hard surface or object, will result in the chainsaw being forced downwardly and rearwardly. Depending on which direction carries the greatest force, the guard arm may engage the work piece and interfere with the downward movement of the chainsaw. If the chainsaw is forced rearwardly, such that the distal end portion 40 of the guard arm clears the work piece, and simultaneously downwardly, the guard arm will assist in shielding the operator against contact with the saw chain should the chainsaw subsequently strike an object below the work piece and fly upwardly and rearwardly, as depicted in FIG. 5.

In order to perform maintenance on the saw chain, such as sharpening or cleaning, the guard arm can be easily lifted to the raised position using the trigger 52. As explained above, the illustrated form of spring 56 functions to retain the guard arm in the raised position during such maintenance of the chainsaw.

The mounting bracket 30 and the guard arm 36 can be made from any of various materials, including without limitation, metal (e.g., steel or aluminum), a tool-grade plastic or combinations thereof. Any of various manufacturing techniques can be implemented to manufacture the chainsaw guard 10. In one specific approach, for example, the guard arm 36 is constructed from a single piece of metal sheet stock, such as by cutting or stamping the piece of metal to the desired shape and then bending the metal to form flange 50, side flanges 72, 72', tab portion 58, and the upturned distal end portion 40. Similarly, the mounting bracket 30 can be constructed by cutting a piece of metal sheet stock and then bending the metal to form the stop member 68 and tab portion 60. In this regard, each of the guard arm 36 and the mounting bracket 30 comprise a unitary or one-piece monolithic construction. As used herein, the term "monolithic construction" refers to a construction that does not include any welds, fasteners, or other means for securing separately formed pieces of material to each other.

In another embodiment, one or more portions of the guard arm and/or the mounting bracket can be separately formed and subsequently joined to each other, such as by welding or mechanical fasteners. For example, tab portions 58, 60 can be formed from separate pieces of metal that are welded to the guard arm and mounting bracket, respectively. In yet another embodiment, the guard arm 36 can be a length of generally U-shaped channel welded or otherwise connected to flange 50. Depending upon the materials that are used, the components may be molded (e.g., of plastic) or otherwise formed into their desired shapes. In addition, different materials may be used for different components. For example, arm 36 may be formed of metal while bracket 30 may be molded of plastic.

Figure 6:
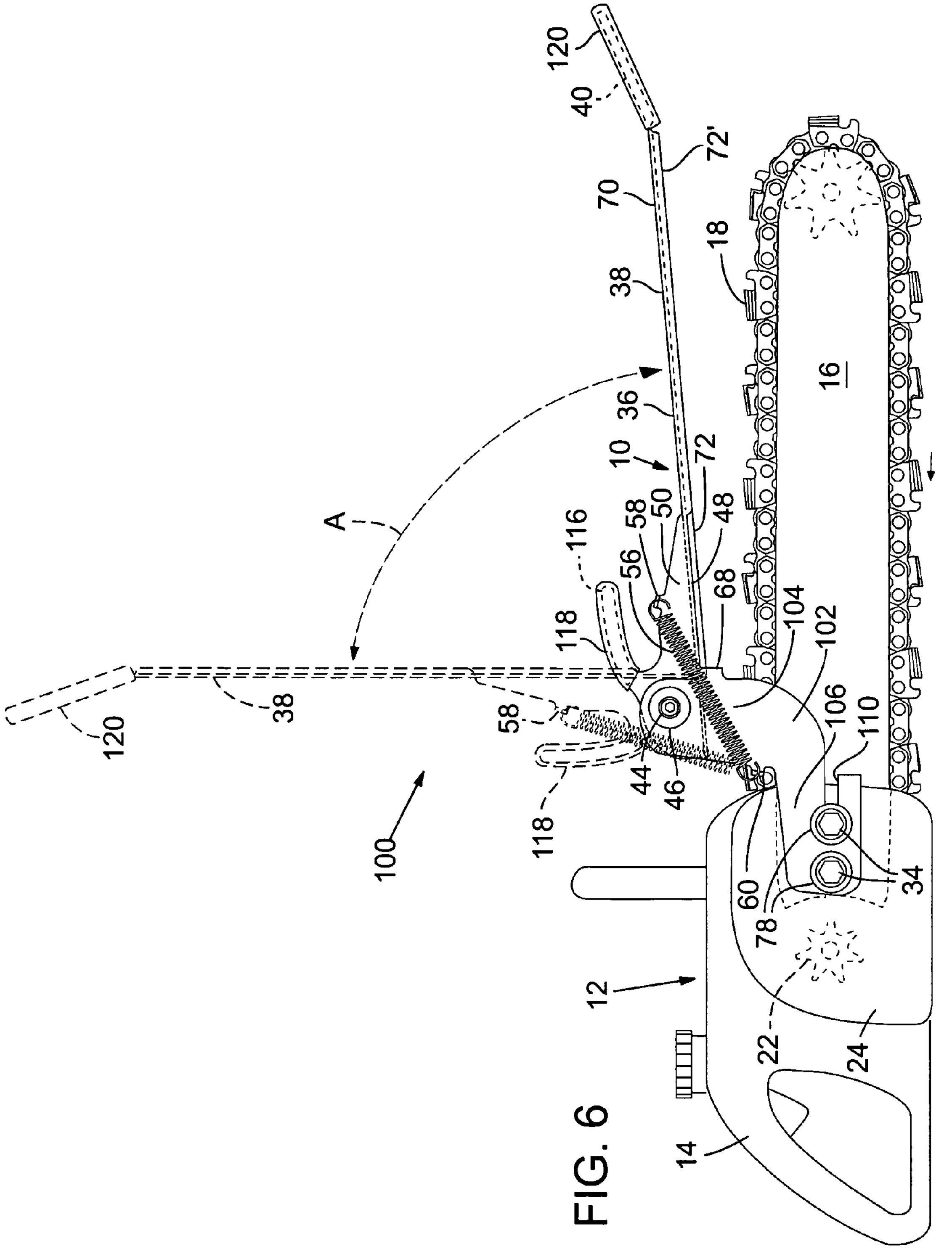
FIG. 6 is a side elevation view of a chainsaw equipped with a saw guard according to another embodiment.
Figure 7:
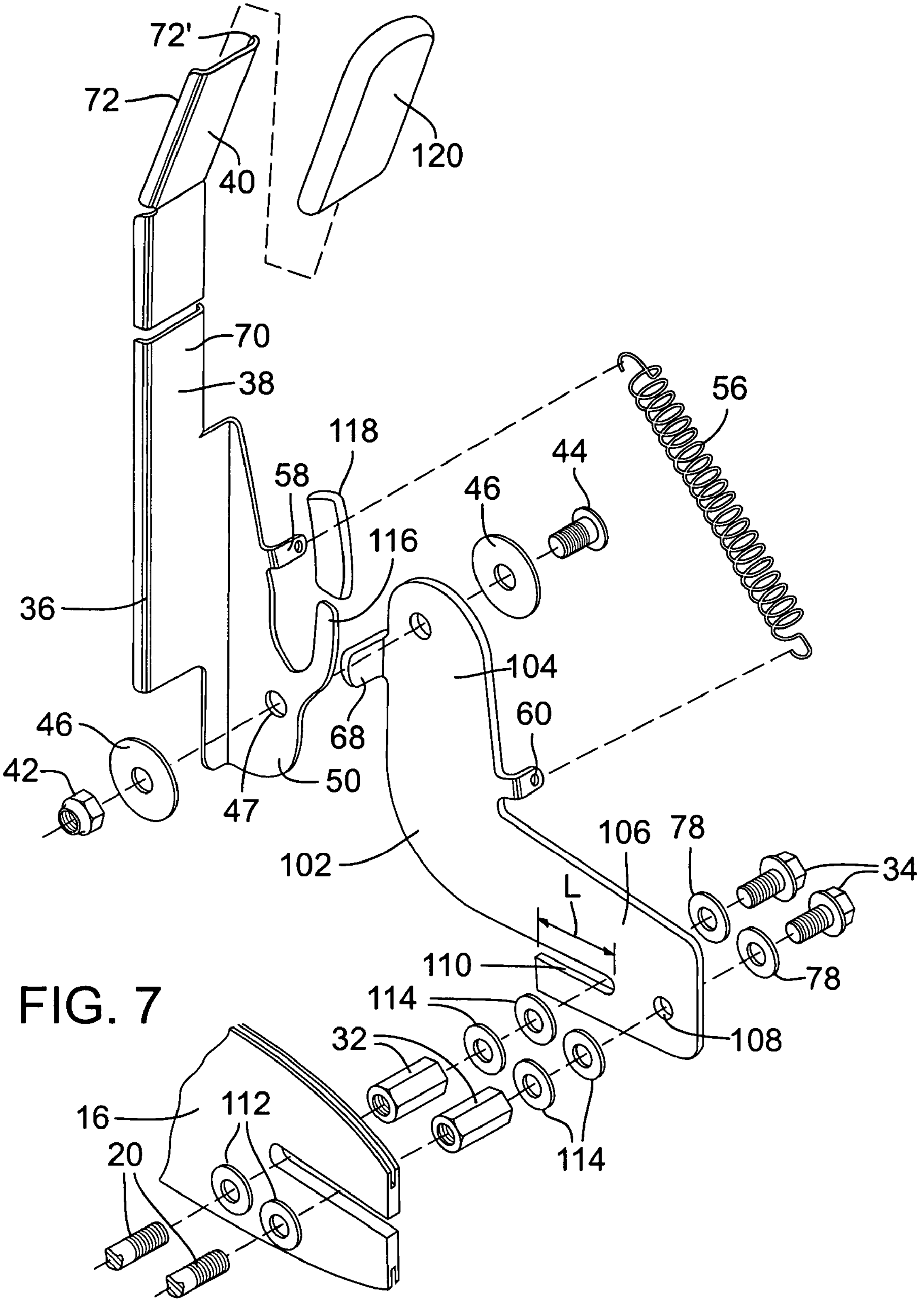
FIG. 7 is a fragmentary exploded view of the chainsaw guard of FIG. 6 showing the various parts thereof.

Referring now to FIGS. 6 and 7, another embodiment of a chainsaw guard indicated generally at 100 is shown mounted to a chainsaw 12. This embodiment shares many similarities with the embodiment of FIGS. 1–5. Hence, components in FIGS. 6–7 that are identical to corresponding components in FIGS. 1–5 have the same respective reference numerals and are not described further.

The illustrated saw guard 100 comprises a mounting member which may be in the form of a mounting bracket 102. Mounting bracket 102 may comprise a body including a generally upright arm supporting upper portion 104 that mounts a guard arm 36 in a pivotal manner and a rearwardly extending or swept back saw chain coupling lower portion 106 that is adapted, for example, to be mounted to the bar studs 20 of the chainsaw. As best shown in FIG. 7, the lower portion 106 is formed with an opening 108 and an elongated slot 110 dimensioned to receive respective bolts 34 tightened into extenders 32. Washers 112 can be placed on bar studs 20, and one or more pairs of washers 114 can be placed on bolts 34 between the mounting bracket 102 and extenders 32. The number of washers 114 that are used determines the spacing between the mounting bracket 102 and the guide bar 16, and therefore the alignment of the guard arm 36 above the guide bar 16. When the saw guard is installed, the guard arm 36 desirably should be centered over the guide bar 16.

Since the spacing between the bar studs 20 can vary depending on the make or model of the chainsaw, the slot 110 is of sufficient length to permit mounting of the mounting bracket 102 to a number of different chainsaws having different bar stud spacing. In a specific embodiment, for example, the slot 110 has a minimum length L of approximately 1.25 inches, although the length L can be greater or less than 1.25 inches. The swept back lower portion of mounting bracket in this embodiment facilitates mounting of the bracket to numerous chainsaw models manufactured by various manufacturers, including without limitation certain chainsaw models from Stihl Incorporated (Virginia Beach, Va.), Husqvarna AB (Huskvarna, Sweden), Echo Incorporated (Lake Zurich, Ill.), Poluan (Nashville, Ark.), Homelite Shindaiwa Inc. (Tualatin, Oreg.), Jonsereds (Sweden), John Deere & Co. (Moline, Ill.) and Sears, Roebuck & Co.

The saw guard 110 in the illustrated configuration includes an elongated lever or handle 116 extending from the flange 50. The handle 116 desirably is of sufficient length to permit an operator to grasp the handle with the hand for lifting or lowering the guard arm. As shown, the handle 116 can include an elastomeric (e.g., rubber) gripping member 118. Additionally, an elastomeric covering 120 can be provided on the distal end portion 40 of the guard arm to provide a more resilient surface in the event the chainsaw kicks back and the guard arm end portion 40 strikes the operator.

The present invention has been shown in the described embodiments for illustrative purposes only. The present invention may be subject to many modifications and changes without departing from the spirit or essential characteristics thereof. We therefore claim as our invention all such modifications as come within the spirit and scope of the following claims.

We claim:

1. A chainsaw guard for use on a chainsaw having a housing, a saw chain guide bar extending from the housing and fastened to the housing by fasteners, and a saw chain carried by the guide bar, the chainsaw guard comprising:

an elongated guard member having downwardly extending side portions; and a guard mounting member pivotally coupled to the guard member and adapted to mount to the chainsaw such that the guard member is supported above and spaced from the chain and the guide bar, wherein the guard member is pivotable between a lower position above the chain to other positions spaced further from the chain;

wherein the guard mounting member and the guide bar are mountable to the housing by said fasteners;

wherein the guard member comprises a handle portion adjacent the guard mounting member for use in manually pivoting the guard member relative to the chain.

2. The chainsaw guard of claim 1, wherein the handle portion is fixedly secured to the guard member.

3. The chainsaw guard of claim 1, wherein the chainsaw comprises plural bar studs and wherein the guard mounting member and the guide bar are mountable to the bar studs.

4. The chainsaw guard of claim 3, wherein the guard mounting member includes an upper portion pivotally coupled to the guard member for pivoting about a guard member pivot axis and a lower portion that is elongated and extends rearwardly of the guard member pivot axis, wherein the lower portion is adapted to be mounted to the bar studs.

5. The chainsaw guard of claim 1, wherein the guard member has a generally flat, elongated central portion, and wherein the side portions extend downwardly from opposite sides of the central portion.

6. A chainsaw guard for use on a chainsaw having a housing, a saw chain guide bar extending from the housing and fastened to the housing by fasteners, and a saw chain carried by the guide bar, the chainsaw guard comprising:

an elongated guard member having downwardly extending side portions; and a guard mounting member pivotally coupled to the guard member and adapted to mount to the chainsaw such that the guard member is supported above and spaced from the chain and the guide bar, wherein the guard member is pivotable between a lowered position above the chain and a fully raised position away from the guide bar; and a spring having a first end connected to the guard member at a first location and a second end connected to the guard mounting member at a second location such that the spring resiliently urges the guard member in a first direction to the lowered position when the guard member is between the lowered position and a partially raised position spaced from the guide bar, and resiliently urges the guard member in a second direction, opposite the first direction, to the fully raised position when the guard member is pivoted past the partially raised position;

wherein the guard mounting member and the guide bar are mountable to the housing by said fasteners.

7. The chainsaw guard of claim 6, wherein the guard member has a generally U-shaped cross section along at least a major portion of its length.

8. The chainsaw guard of claim 6, wherein the guard member comprises a proximal end portion pivotally coupled to the guard mounting member and a distal end portion that can pivot relative to the guard mounting member, the chainsaw guard further comprising an extension portion extending from the proximal end portion of the guard member and toward the distal end portion of the guard member for use by a user to pivot the guard member between the lowered and the fully and partially raised positions.

9. The chainsaw guard of claim 6, wherein the guard mounting member comprises a single stop member for limiting upward and downward pivoting of the guard member relative to the guard mounting member, the stop member having a first surface that contacts and prevents further downward pivoting of the guard member when the guard member is in the lowered position and a second surface that contacts and prevents further upward pivoting of the guard member when the guard member is in the fully raised position.

10. The chainsaw guard of claim 9, wherein the stop member is located below the guard member.

11. A chainsaw guard for use on a chainsaw having a motor housing, a saw chain guide bar mounted to first and second bar studs and extending from the housing, and a saw chain carried by the guide bar, the chainsaw guard comprising:

a mounting bracket having a generally upright upper end portion and an elongated lower end portion extending rearwardly from the upper end portion, the lower end portion being formed with a hole for securing the mounting bracket to the first bar stud and an elongated slot for securing the mounting bracket to the second bar stud, the mounting bracket having a first, laterally bent tab portion;

a guard arm having a proximal end portion and a distal end portion, the guard arm being pivotally coupled to the upper end portion of the mounting bracket at its proximal end portion to permit pivoting of the guard arm toward and away from the guide bar about a pivot axis, the guard arm having a second, laterally bent tab portion, the guard arm comprising an elongated central portion and side portions extending downwardly from opposite sides of the central portion, the distal end portion being angled slightly upwardly relative to the proximal end portion;

an extension portion extending upwardly and forwardly from the proximal end portion of the guard arm toward the distal end portion of the guard arm for use by a user to pivot the guard arm toward and away from the guide bar;

a stop member integrally formed with the mounting bracket for limiting pivoting movement of the guard arm relative to the mounting bracket, the stop member having a first surface for limiting downward pivoting of the guard arm and positioning the guard arm at a predetermined height above the guide bar and a second surface for limiting upward pivoting of the guard arm away from the guide bar; and a coil spring having first and second ends, the first end being connected to the first tab portion and the second end being connected to the second tab portion, wherein the spring is located relative to the pivot axis so as to urge the guard arm against the first surface of the stop member when the guard arm is within a first range of motion and to urge the guard arm against the second surface of the stop member when the guard arm is within a second range of motion.

12. A chainsaw guard for use on a chainsaw having a motor housing, a saw chain guide bar extending from the housing, the saw chain guide bar being mounted to the housing by plural bar studs, and a saw chain carried by the guide bar, the chainsaw guard comprising:

a mounting bracket for mounting to the housing, the mounting bracket having an opening and an elongated slot positioned for mounting to the bar studs;

a guard arm pivotally coupled to the mounting bracket and being pivotable relative to the mounting bracket about a pivot axis between a down position in which the guard arm extends over the guide bar and a raised position away from the guide bar, the guard arm comprising an elongated central portion extending above the majority of the length of the guide bar and a flange extending above the central portion in a direction generally perpendicular to the length of the central portion, the mounting bracket being pivotally connected to the flange; and a spring having first and second ends, the first end being connected to the mounting bracket and the second end being connected to the flange at a location above the central portion such that the spring exerts a biasing force to resiliently bias the guard arm to the down position;

wherein the mounting bracket is mountable to the bar studs with all of the bar studs being positioned rearwardly of the pivot axis;

wherein each of the guard arm and the mounting bracket has a monolithic construction;

the guard arm comprising a handle fixedly secured to and extending directly from the flange to allow a user to lift or lower the guard arm toward or away from the guide bar.

13. A chainsaw guard for use on a chainsaw having a motor housing, a saw chain guide bar extending from the housing, and a saw chain carried by the guide bar, the chainsaw guard comprising:

a mounting member for mounting to the chainsaw;

a guard arm having a proximal end portion and a distal end portion, the guard arm being pivotally coupled to the mounting member at the proximal end portion of the guard arm and to permit pivoting of the guard arm between a down position in which the guard arm extends over the guide bar and an up position in which it extends away from the guide bar; and an extension portion fixedly secured to the proximal end portion of the guard arm, the extension portion extending upwardly from the guard arm and towards the distal end portion of the guard arm to form a gripping portion that can be grasped by a user's hand to pivot the guard arm between the down and up positions.

14. The chainsaw guard of claim 13, further comprising an elastomeric gripping pad covering a portion of the gripping portion.

15. The chainsaw guard of claim 14, wherein the mounting member comprises an upper portion pivotally coupled to the guard arm and a lower portion extending rearwardly from the upper portion and adapted to be coupled to the housing.

16. The chainsaw guard of claim 15, wherein the chainsaw housing comprises guide bar mounting studs and the guide bar is mounted to the bar studs, and wherein the lower portion of the mounting member is configured to be mounted to the bar studs.

17. The chainsaw guard of claim 13, wherein the chainsaw housing comprises guide bar mounting studs and the guide bar is mounted to the bar studs, and wherein the mounting member comprises a first portion pivotally supporting the guard arm and a second swept back portion including an opening and an elongated slot positioned for mounting to the bar studs.

18. The chainsaw guard of claim 13, further comprising a biasing member coupled to the mounting bracket member and the guard arm to bias the guard arm to its down position.

19. The chainsaw guard of claim 18, wherein:

the guard arm is formed with a laterally bent tab portion;

the mounting member is formed with a laterally bent tab portion; and the biasing member comprises a coil spring connected at opposite ends to the tab portions of the guard arm and the mounting member.

20. The chainsaw guard of claim 13, wherein guard arm comprises an elongated central portion and elongated side portions extending downwardly from opposite sides of the central portion.

21. The chainsaw guard of claim 13, wherein the mounting member comprises a single stop member for limiting pivoting movement of the guard arm relative to the mounting member, the stop member having a first surface for limiting downward pivoting of the guard arm and positioning the guard arm and a second surface for limiting upward pivoting of the guard arm.

22. The chainsaw guard of claim 21, wherein the stop member comprises a laterally bent tab portion of the mounting member located below the guard arm.

23. A chainsaw guard for use on a chainsaw having a chain guide bar and a saw chain carried by the guide bar, the chainsaw guard comprising:

an elongated guard member having a proximal end portion and a distal end portion, wherein the proximal end portion is configured to be pivotally coupled to the chainsaw so as to permit pivoting of the guard member toward and away from the upper end of the guide bar;

the guard member comprising an elongated central portion extending above the majority of the length of the guide bar and a flange extending above the central portion in a direction generally perpendicular to the length of the central portion, the guard member being pivotal about a pivot axis extending through the flange; and the guard member comprising a user-engageable extension portion extending directly from the flange adjacent to the proximal end portion of the guard member to allow a user to lift or lower guard member toward or away from the guide bar.

24. The chainsaw guard of claim 23, wherein the user-engageable portion extends above the proximal end portion of the guard member and is fixedly secured to the flange.

25. The chainsaw guard of claim 24, wherein the guard member includes two downwardly extending side walls along at least a major portion of the length of the guard member.

26. The chainsaw guard of claim 25, wherein the elongated central portion of the guard member is generally flat, and wherein the side walls depend from opposite sides of the central portion.

* * * * *